(12) United States Patent
Kuwabara et al.

(10) Patent No.: US 9,106,506 B2
(45) Date of Patent: Aug. 11, 2015

(54) FILTER-BASED FORWARDING IN A NETWORK

(75) Inventors: Ken Kuwabara, Sunnyvale, CA (US);
Steven Lin, Cupertino, CA (US);
Michael Langdon, Hillsborough, NJ (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 12/878,849

(22) Filed: Sep. 9, 2010

(65) Prior Publication Data

US 2011/0007743 A1 Jan. 13, 2011

Related U.S. Application Data

(63) Continuation of application No. 09/990,204, filed on Nov. 21, 2001, now Pat. No. 7,813,346.

(51) Int. Cl.
| | | |
|---|---|---|
| *H04L 12/701* | (2013.01) | |
| *H04L 12/723* | (2013.01) | |
| *H04L 12/741* | (2013.01) | |
| *H04L 29/06* | (2006.01) | |

(52) U.S. Cl.
CPC ............... *H04L 45/00* (2013.01); *H04L 45/50* (2013.01); *H04L 45/54* (2013.01); *H04L 69/22* (2013.01)

(58) Field of Classification Search
CPC ....................................... H04L 45/00
USPC .............. 370/252, 235, 352, 390, 392, 395.2, 370/400, 469
See application file for complete search history.

(56) References Cited

U.S. PATENT DOCUMENTS

| | | | |
|---|---|---|---|
| 5,479,401 A | 12/1995 | Bitz et al. | |
| 5,617,421 A | 4/1997 | Chin et al. | |
| 5,649,108 A | 7/1997 | Spiegel et al. | |
| 5,684,961 A * | 11/1997 | Cidon et al. .................. | 709/243 |
| 5,748,905 A | 5/1998 | Hauser et al. | |
| 5,781,729 A | 7/1998 | Baker et al. | |
| 5,872,783 A | 2/1999 | Chin | |
| 5,951,651 A * | 9/1999 | Lakshman et al. ............ | 709/239 |
| 6,078,963 A | 6/2000 | Civanlar et al. | |
| 6,088,356 A | 7/2000 | Hendel et al. | |
| 6,115,378 A | 9/2000 | Hendel et al. | |
| 6,205,488 B1 | 3/2001 | Casey et al. | |
| 6,212,184 B1 | 4/2001 | Venkatachary et al. | |
| 6,304,912 B1 | 10/2001 | Oguchi et al. | |
| 6,314,520 B1 * | 11/2001 | Schell et al. ..................... | 726/13 |

(Continued)

OTHER PUBLICATIONS

Co-pending U.S. Appl. No. 09/990,204, filed Nov. 21, 2001, entitled "Filter-Based Forwarding in a Network," by Ken Kuwabara et al., 26 pages.

*Primary Examiner* — Andrew Lai
*Assistant Examiner* — Andrew C Lee
(74) *Attorney, Agent, or Firm* — Harrity & Harrity, LLP

(57) ABSTRACT

A router receives a packet at an ingress interface. The router classifies the received packet based on at least a first field value contained in the header of the packet. According to the classification of the received packet, the router associates one of the plurality of forwarding tables to the packet. The router then performs a lookup operation in the associated forwarding table according to at least a second field value contained in the header of the packet. Based on the lookup operation, the router determines an egress interface and transmits the received packet from the determined egress interface.

20 Claims, 9 Drawing Sheets

(56) References Cited

U.S. PATENT DOCUMENTS

| | | | | |
|---|---|---|---|---|
| 6,330,614 B1 | * | 12/2001 | Aggarwal et al. | 709/236 |
| 6,359,879 B1 | | 3/2002 | Carvey et al. | |
| 6,396,833 B1 | | 5/2002 | Zhang et al. | |
| 6,430,188 B1 | | 8/2002 | Kadambi et al. | |
| 6,463,067 B1 | | 10/2002 | Hebb et al. | |
| 6,466,985 B1 | | 10/2002 | Goyal et al. | |
| 6,526,056 B1 | * | 2/2003 | Rekhter et al. | 370/392 |
| 6,553,028 B1 | | 4/2003 | Tang et al. | |
| 6,578,080 B1 | | 6/2003 | Dwork | |
| 6,587,463 B1 | | 7/2003 | Hebb et al. | |
| 6,594,268 B1 | * | 7/2003 | Aukia et al. | 370/400 |
| 6,597,703 B1 | * | 7/2003 | Li et al. | 370/428 |
| 6,615,336 B1 | | 9/2003 | Chen et al. | |
| 6,628,653 B1 | | 9/2003 | Salim | |
| 6,647,424 B1 | * | 11/2003 | Pearson et al. | 709/232 |
| 6,674,743 B1 | | 1/2004 | Amara et al. | |
| 6,678,274 B1 | | 1/2004 | Walia et al. | |
| 6,707,817 B1 | | 3/2004 | Kadambi et al. | |
| 6,711,172 B1 | * | 3/2004 | Li | 370/401 |
| 6,735,198 B1 | | 5/2004 | Edsall et al. | |
| 6,744,652 B2 | * | 6/2004 | Srinivasan et al. | 365/49.11 |
| 6,748,437 B1 | * | 6/2004 | Mankude et al. | 709/227 |
| 6,768,738 B1 | | 7/2004 | Yazaki et al. | |
| 6,771,662 B1 | * | 8/2004 | Miki et al. | 370/469 |
| 6,778,539 B1 | | 8/2004 | Rygh | |
| 6,804,234 B1 | | 10/2004 | Chow | |
| 6,810,427 B1 | | 10/2004 | Cain | |
| 6,816,455 B2 | | 11/2004 | Goldberg et al. | |
| 6,839,350 B1 | | 1/2005 | Inouchi et al. | |
| 6,907,001 B1 | | 6/2005 | Nakayama et al. | |
| 6,907,470 B2 | | 6/2005 | Sawada et al. | |
| 6,940,862 B2 | | 9/2005 | Goudreau | |
| 6,947,415 B1 | | 9/2005 | Nagaraj | |
| 6,956,858 B2 | | 10/2005 | Hariguchi et al. | |
| 6,977,932 B1 | | 12/2005 | Hauck | |
| 6,981,087 B1 | | 12/2005 | Heitkamp et al. | |
| 6,987,762 B2 | | 1/2006 | Shiota | |
| 7,007,080 B2 | * | 2/2006 | Wilson | 709/221 |
| 7,012,919 B1 | | 3/2006 | So et al. | |
| 7,023,846 B1 | * | 4/2006 | Andersson et al. | 370/389 |
| 7,024,460 B2 | * | 4/2006 | Koopmas et al. | 709/206 |
| 7,061,921 B1 | | 6/2006 | Sheth | |
| 7,065,578 B2 | * | 6/2006 | Garrett et al. | 709/229 |
| 7,072,346 B2 | * | 7/2006 | Hama | 370/395.53 |
| 7,075,932 B2 | * | 7/2006 | Matsuhira et al. | 370/395.31 |
| 7,079,493 B2 | | 7/2006 | Nakamichi et al. | |
| 7,079,533 B1 | | 7/2006 | Erimli et al. | |
| 7,088,717 B2 | | 8/2006 | Reeves et al. | |
| 7,088,718 B1 | | 8/2006 | Srivastava | |
| 7,092,361 B2 | | 8/2006 | Puppa et al. | |
| 7,095,740 B1 | * | 8/2006 | Jagannath et al. | 370/392 |
| 7,103,055 B2 | * | 9/2006 | Kadambi et al. | 370/409 |
| 7,111,071 B1 | | 9/2006 | Hooper | |
| 7,116,679 B1 | | 10/2006 | Ghahremani | |
| 7,120,165 B2 | * | 10/2006 | Kasvand-Harris et al. | 370/466 |
| 7,126,907 B2 | | 10/2006 | Carpini et al. | |
| 7,139,253 B2 | | 11/2006 | Davis et al. | |
| 7,215,637 B1 | * | 5/2007 | Ferguson et al. | 370/230.1 |
| 7,319,699 B1 | * | 1/2008 | Provine et al. | 370/395.3 |
| 2001/0007557 A1 | * | 7/2001 | Yamada et al. | 370/389 |
| 2001/0019554 A1 | | 9/2001 | Nomura et al. | |
| 2001/0046227 A1 | | 11/2001 | Matsuhira et al. | |
| 2001/0050914 A1 | * | 12/2001 | Akahane et al. | 370/382 |
| 2002/0118682 A1 | | 8/2002 | Choe | |
| 2002/0145981 A1 | * | 10/2002 | Klinker et al. | 370/244 |
| 2003/0043792 A1 | * | 3/2003 | Carpini et al. | 370/386 |
| 2003/0048785 A1 | | 3/2003 | Calvignac et al. | |
| 2003/0063613 A1 | | 4/2003 | Carpini et al. | |
| 2003/0088699 A1 | * | 5/2003 | Luciani et al. | 709/243 |
| 2003/0210686 A1 | | 11/2003 | Terrell et al. | |
| 2005/0117592 A1 | * | 6/2005 | Nagami et al. | 370/401 |

\* cited by examiner

# FILTER-BASED FORWARDING IN A NETWORK

RELATED APPLICATION

This application is a continuation of U.S. patent application Ser. No. 09/990,204, filed Nov. 21, 2001, which is incorporated herein by reference.

BACKGROUND OF THE INVENTION

In a conventional computer network (e.g., the Internet), computers communicate over a network infrastructure made up of interconnected nodes, such as routers and/or switches, connected by communication links such as optical fiber, copper cable, and wireless links. Typically, the topology of the network infrastructure is configured in such a way that the infrastructure contains more than one path through which data may be carried from one computer to another. The topology, for example, may include a partial mesh configuration, where a node is connected to multiple other nodes. A router in such a network, therefore, may contain a plurality of interface ports for connection to multiple neighboring routers.

Such a router typically receives data in discrete units (herein referred to as "packets," which may include frames, cells, packets, or any other fixed- or variable-sized unit of data) at one or more of its ingress interface ports. The router examines destination address information embedded in the packets and determines the appropriate egress interface ports for outputting the respective packets, typically by performing a table lookup. To construct and update tables, routers may use dynamic routing protocols to systematically exchange information with other devices in the network to obtain a view of the network topology (this information being maintained in a routing database, such as one or more routing tables). Based on this information, the router constructs and updates a forwarding table, which associates ranges of destination addresses to respective egress interface ports.

In some cases, however, such use of forwarding tables may be inadequate. By relying on destination addresses to determine the appropriate egress interface port for packets, traditional routers do not distinguish packets according to other criteria. It may be desirable to use other criteria to, for example, facilitate traffic engineering of certain types of packets (i.e., select egress interface ports based on packet type as well as destination address).

In addition, in certain circumstances, the traditional use of forwarding tables may be inadequate to implement virtual private networks (VPNs). In cases where a single router forwards traffic for two separate VPNs, the router needs to ensure that traffic from one VPN is not sent to the other VPN. One proposed solution is to bind one or more ingress interface ports and one or more egress interface ports to each VPN. In this way, the bound ingress and egress interface ports only carry traffic for one VPN, allowing the router to readily maintain separation of traffic for each VPN.

In some cases, however, the network configuration may be such that traffic from two VPNs is intermingled and received at a single ingress interface port of a router. This may happen, for example, where the traffic from the two VPNs is carried over an open access network in which traffic separation is not maintained before arriving at the router. One potential solution is to inject tags into each packet to uniquely identify the VPN from which the packets came. This may be undesirable because additional components or enhancements would be required at each source computer in the VPN to generate tags and at the router to identify the tags and separate the different VPN traffic. Another solution is to use policy-based routing, which involves statically configuring the forwarding table to forward packets according to criteria other than destination address. This may also be undesirable because static policies are typically configured manually and are not updated dynamically as the state of the network changes. Policy-based routing may also require the use of additional components or enhancements.

Thus, there is a need for an invention that more adequately addresses problems occurring in the network.

SUMMARY OF THE INVENTION

According to one embodiment of the invention, a router receives a packet at an ingress interface. The router classifies the received packet based on at least a first field value contained in the header of the packet. According to the classification of the received packet, the router associates one of the plurality of forwarding tables to the packet. The router then performs a lookup operation in the associated forwarding table according to at least a second field value contained in the header of the packet. Based on the lookup operation, the router determines an egress interface and transmits the received packet from the determined egress interface.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and together with the description, serve to explain the principles of the invention.

DESCRIPTION OF THE PREFERRED EMBODIMENTS

Reference will now be made in detail to embodiments of the invention, examples of which are illustrated in the accompanying drawings. Wherever possible, the same reference numbers will be used throughout the drawings to refer to the same or like parts.

According to the invention, a router may perform packet forwarding based on not only the destination address of the packets, but also based upon other information contained in the packets. Such other information may include source address, protocol field, packet classification, and packet type.

In one embodiment, the router of the present invention uses a filter, such as a firewall filter, to classify packets based on packet header field values and selects respective forwarding tables for lookup based on the classification.

Figure 1A:
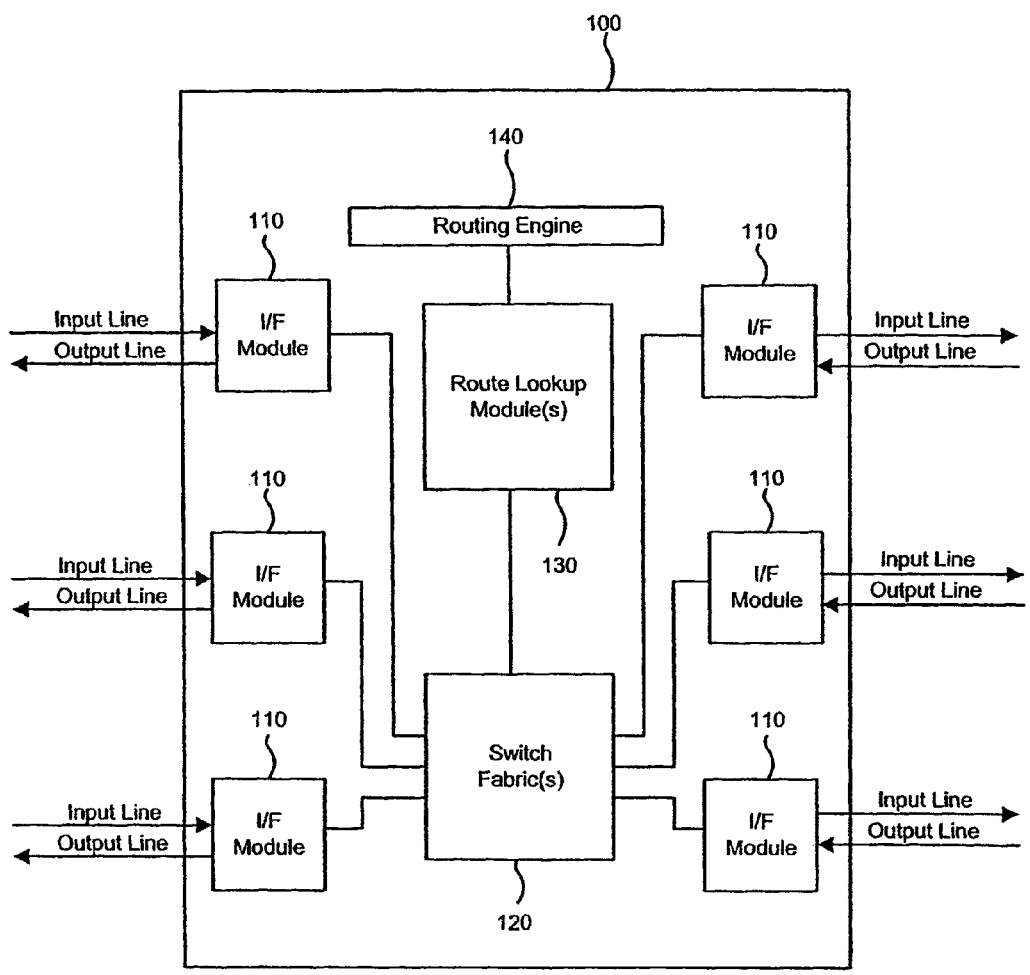
FIG. 1A is a block diagram of a router incorporating principles of the invention according to a first embodiment.

FIG. 1A shows router 100. Generally, router 100 receives packets on the input lines and determines the output lines from which the packets are to be output. As shown in FIG. 1A, router 100 includes a plurality of interface (I/F) modules 110, switch fabric(s) 120, route lookup module(s) 130, and routing engine 140. Each I/F module 110 connects to one or more respective input lines and/or output lines.

Each I/F module 110 contains one or more ingress interface ports (not shown) for receiving packets from respective input lines and/or one or more egress interface ports (not shown) for transmitting packets to respective output lines. I/F module 110 may perform processing on the headers of respective packets (e.g., layer 2/3 header processing) so the packets are in the appropriate format for processing through switch fabric 120 (for packets received at the ingress interface ports) and for transmission over the output lines (for packets to be sent out the egress interface ports). In one embodiment, I/F modules 110 are implemented as circuit boards that are insertable and removable from router 100. One or more I/F modules 110 may be inserted at a time.

Switch fabric 120 contains logic for receiving packets from I/F modules 110 and for transmitting packets out to I/F modules 110. In one embodiment, switch fabric 120 may contain buffer memory for storing received packets. In another embodiment, switch fabric may be a cross-connect connecting sets of I/F modules 110 with buffer memory contained in respective I/F modules 110. Switch fabric 120 preferably provides packet header information (e.g., destination address information) for received packets to route lookup module 130 and receives identifiers specifying which egress interface ports in the I/F modules 110 to forward the packets to.

Each of route lookup module(s) 130 examines characteristics of packets flowing through switch fabric 120 to determine the manner in which they are to be forwarded (e.g., determining the egress interface ports on which respective packets are to be output). In one embodiment, route lookup module 130 examines packet header information for respective packets, which may include performing a filtering operation and table lookups using one or more forwarding tables. One embodiment of route lookup module 130 is described in connection with FIG. 2.

Routing engine 140 maintains a database of routing information which may be received in route messages from other routers using routing protocols. Routing engine 140 preferably generates forwarding tables which are transmitted to route lookup module 130. Routing engine 140 systematically receives updated information reflecting changes in the network, updates its database (which may be stored as routing tables), generates one or more forwarding tables from the database, and transmits the forwarding tables to route lookup module 130. Routing engine 140 preferably comprises a processor executing routing protocols for computing routes and/or network topology.

Figure 1B:
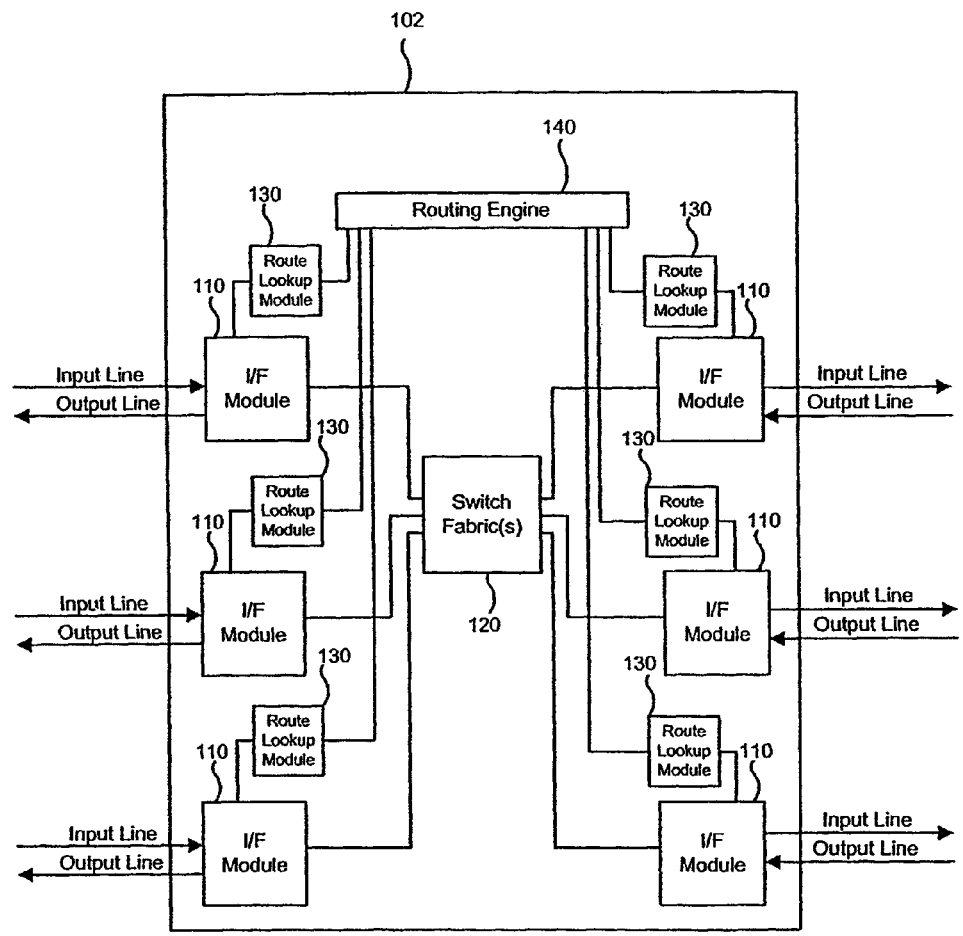
FIG. 1B is a block diagram of a router incorporating principles of the invention according to a second embodiment.

FIG. 1B is a block diagram of router 102. Router 102 is similar to router 100, except that each I/F module 110 has a corresponding route lookup module 130 connected to it. In addition, routing engine 140 connects to each of the route lookup modules 130. Router 102 operates in a manner similar to router 100, except that a lookup operation is performed by the route lookup module 130 corresponding to the I/F module 110 at which packets are received. I/F modules 110 provide packet header information to the corresponding route lookup modules 130 and receive egress interface port information for each packet. I/F modules 110 transmit the packets and received egress interface port information to switch fabric 120, which forwards the packets to the appropriate I/F modules 110. To carry out this operation, each I/F module 110 in router 102 may contain buffer memory for storing packets.

FIGS. 1A and 1B show different embodiments of routers that may be used with the invention. In alternative embodiments, the invention may be used with other router or switch architectures or in any device that performs packet forwarding.

Figure 2:
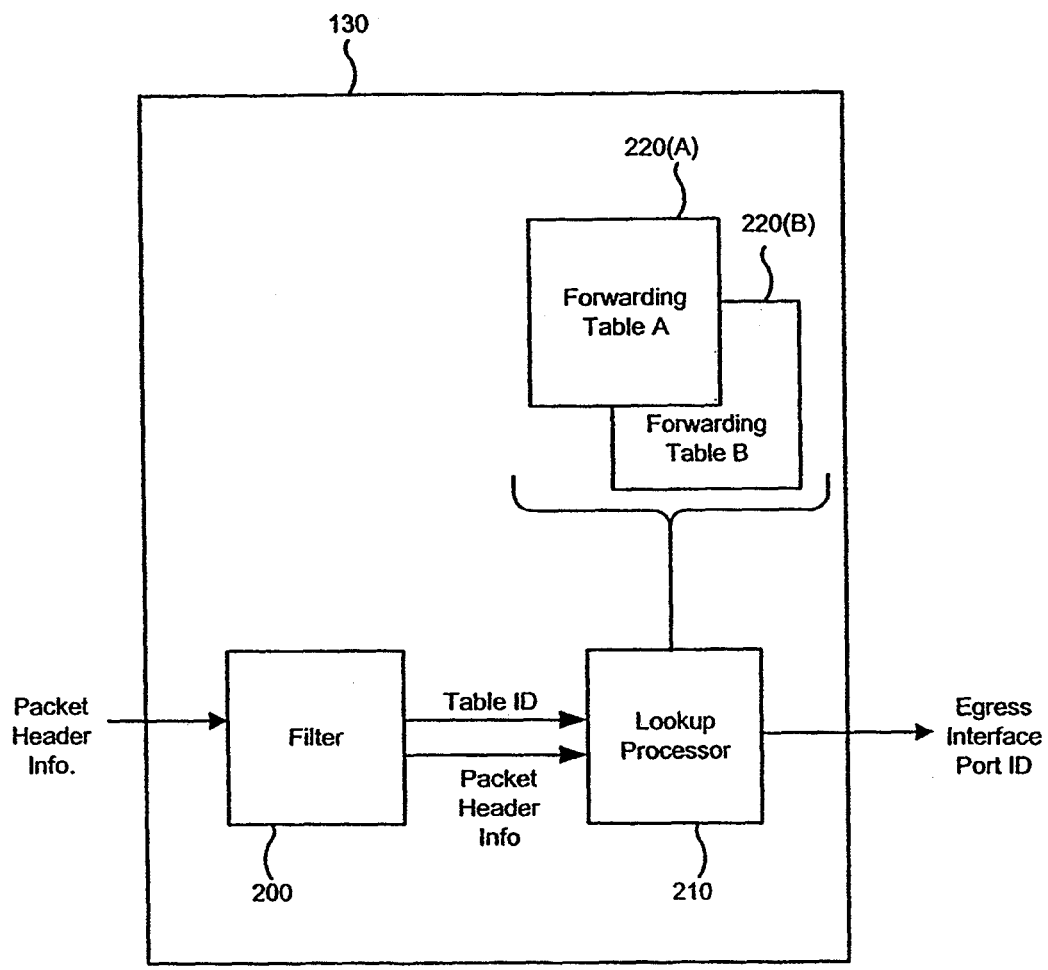
FIG. 2 is a block diagram of a route lookup module incorporating principles of the invention.

FIG. 2 shows a block diagram of route lookup module 130. As shown in FIG. 2, route lookup module 130 includes filter 200, lookup processor 210, and a plurality of forwarding tables 220 (shown as 220(A) and 220(B)) stored in memory. While two forwarding tables 220 are shown in FIG. 2, any number of forwarding tables may be used in alternative embodiments. Lookup processor 210 is connected to filter 200 and forwarding tables 220.

Filter 200 is preferably a firewall filter which may be programmed to classify or identify packets based on selected criteria and perform certain actions based on those classifications. Such criteria, for example, may involve the content of received packets, such as IP destination address, IP source address, IP protocol field, the ingress and/or egress router interfaces, and the state of the router. In a preferred embodiment, filter 200 classifies packets based on source address information and selects one of forwarding tables 220 based on that classification. In other embodiments, other actions may be carried out in addition to the selection of one of forwarding tables 220. Filter 200 may be implemented in hardware as circuit logic for carrying out the respective operation or as one or more processors programmed to carry out the operation.

Lookup processor 210 performs table lookups. For each packet, lookup processor 210 preferably receives packet header information, including the destination addresses of the packets, and a table identifier specifying a particular forwarding table 220 to be used and outputs an egress interface port identifier for that packet. In addition to an egress interface port identifier, lookup processor 210 may, in appropriate cases, output the address of the neighboring device to which the packet is to be sent. This may be appropriate, for example, when the egress interface port is an Ethernet port. Lookup processor 210 may be implemented in hardware as circuit logic for carrying out the respective operation or as one or more processors programmed to carry out the operation.

Each of forwarding tables 220 contains entries associating ranges of destination addresses to corresponding egress interface ports in the router. In one embodiment, each forwarding table 220 corresponds to a separate virtual private network and at least some of the entries in each forwarding table 220 correspond to label switched paths that have been established to other nodes in the respective virtual private network.

While forwarding tables 220 may contain entries associating address ranges with respective egress interface port identifiers, alternative implementations of forwarding tables 220 may contain one or more levels of indirection. For example, forwarding tables 220 may associate address ranges with nexthop identifiers. The nexthop identifiers are associated with egress interface ports (or other actions) in a nexthop resolution table.

Figure 3:
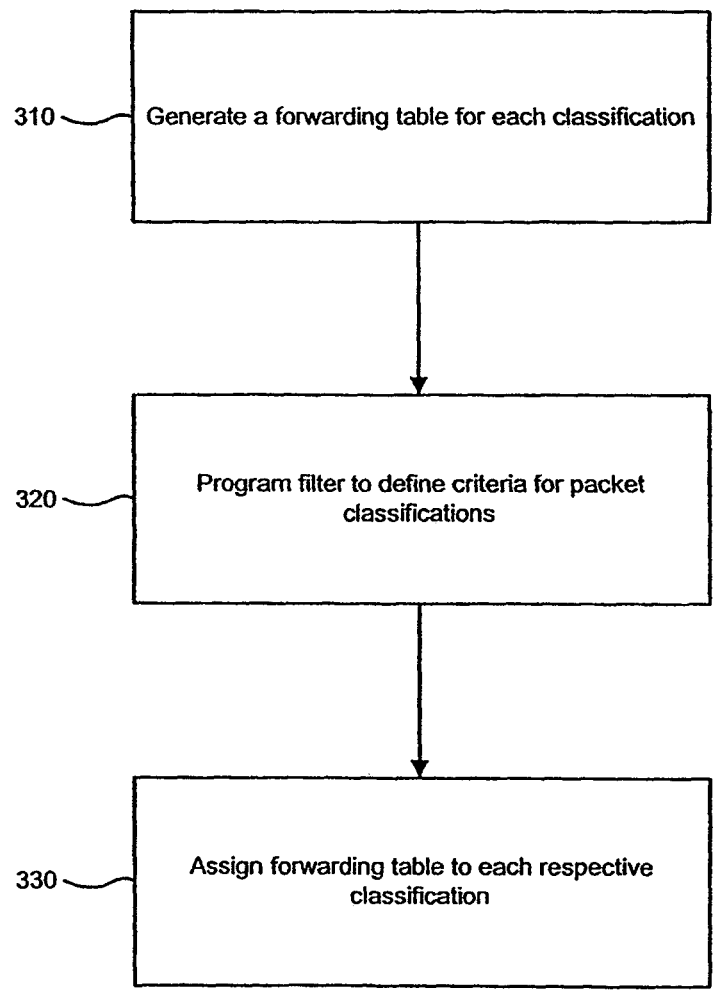
FIG. 3 is a flow chart representing the initialization process for a router according to the invention.

FIG. 3 shows a flow diagram of a process for initializing a router in accordance with the invention. A forwarding table is generated for each classification that will be programmed into the filter (step 310). The filter is then programmed to define the criteria used for packet classification (step 320). Such classifications may, for example, include ranges of source addresses, other packet header criteria, and a default if no criteria is met. The filter is programmed to select a forwarding table corresponding to each respective classification (step 330).

Figure 4:
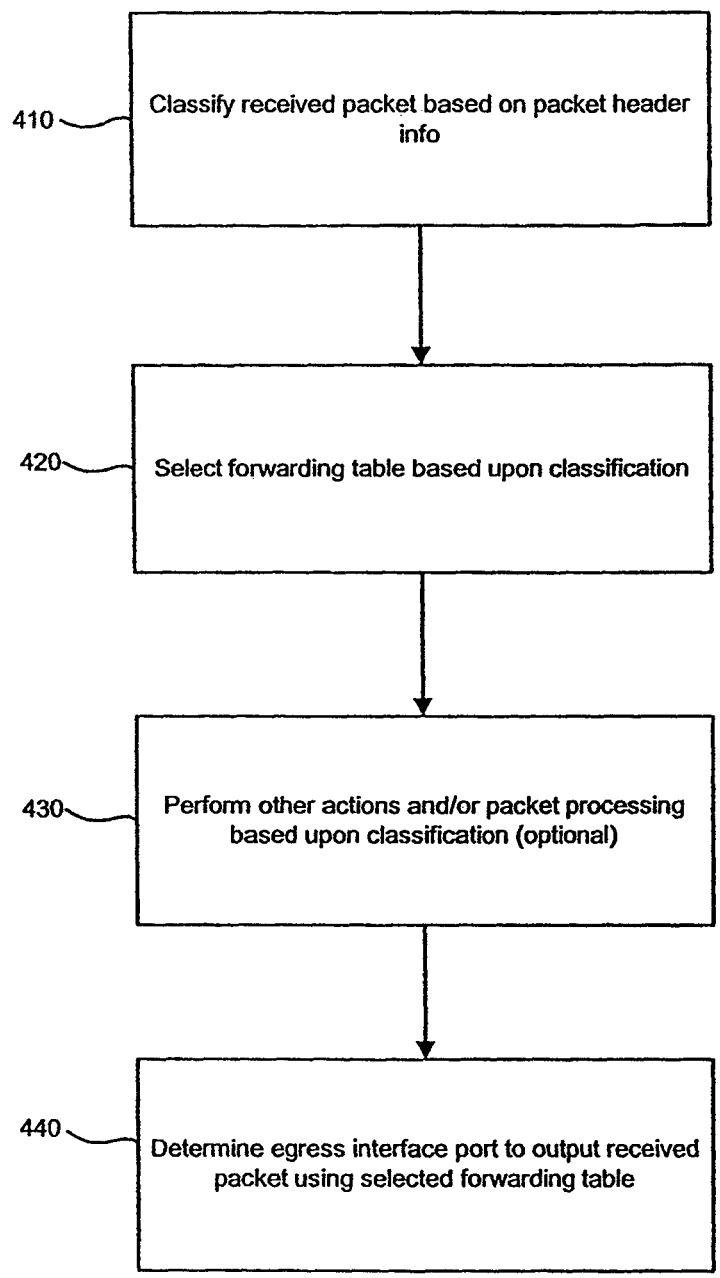
FIG. 4 is a flow diagram representing a process for forwarding packets in a router according to the invention.

FIG. 4 shows a flow diagram representing a process for the operation of a router (such as router 100 or 102) in accordance with the present invention. A packet received at the router is classified based on packet header information (step 410). This step may be performed by a programmed filter, such as a firewall filter that uses packet header information criteria to classify the packet. In a preferred embodiment, the filter classifies packets based on source address. The packet may be classified in the default classification if no criteria is met for that packet. A forwarding table is then selected based upon the classification (step 420). In a preferred embodiment, the filter selects a forwarding table for a packet based on the classification of that packet.

In alternative embodiments, additional or alternative actions and/or packet processing may be performed based upon the classification (step 430). Such other actions may include, for example, sampling, policing, logging, and setting alerts. Packet processing that may be performed may include label encapsulation and/or decapsulation. The output port on which the packet will be output is determined using the selected forwarding table (step 440). This may be done by using the packet header information, such as the destination addresses, to look up the corresponding egress interface output port identifier (and/or neighboring device address) in the selected forwarding table.

Figure 5:
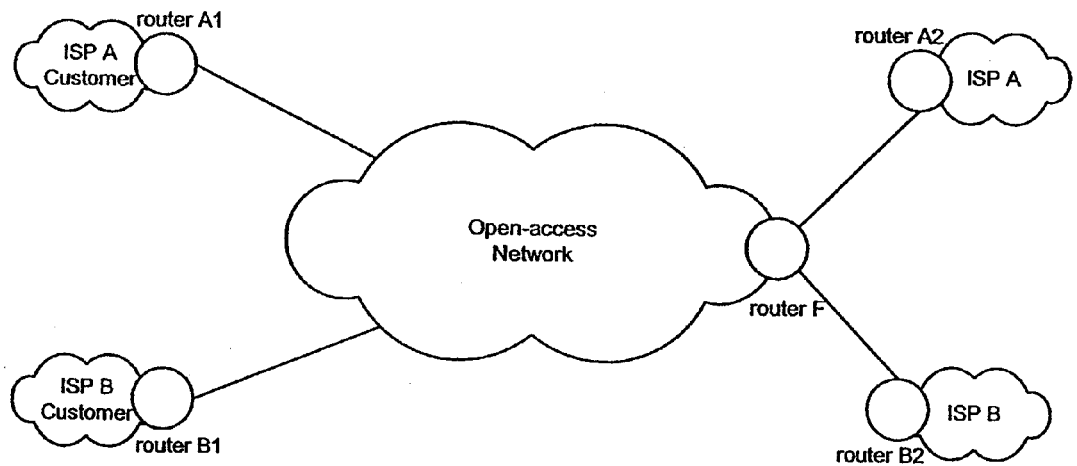
FIG. 5 shows a first example of a network topology using a router according to the invention.

FIG. 5 shows an example of a network topology using a router of the present invention. Two Internet Service Providers (ISPs) are represented: ISP A and ISP B. Each ISP customer desires to access its respective ISP's network and must do so through an open-access network. Router F serves as a gateway between the open-access network and each ISP network.

When data from the ISP A customer and the ISP B customer are sent to the open access network, router F operates to separate those packets and transmit them to the networks of the respective ISPs. Router F, for example, may be programmed such that its firewall filter detects packets coming from the ISP A customer by identifying the source addresses of packets from the ISP A customer and detects packets from the ISP B customer by identifying the source addresses of packets from the ISP B customer. When the firewall filter in router F determines that a packet has come from either the ISP A customer or the ISP B customer, it can then select the appropriate forwarding table which contains entries to egress interface ports connected to the respective ISP network.

Figure 6:
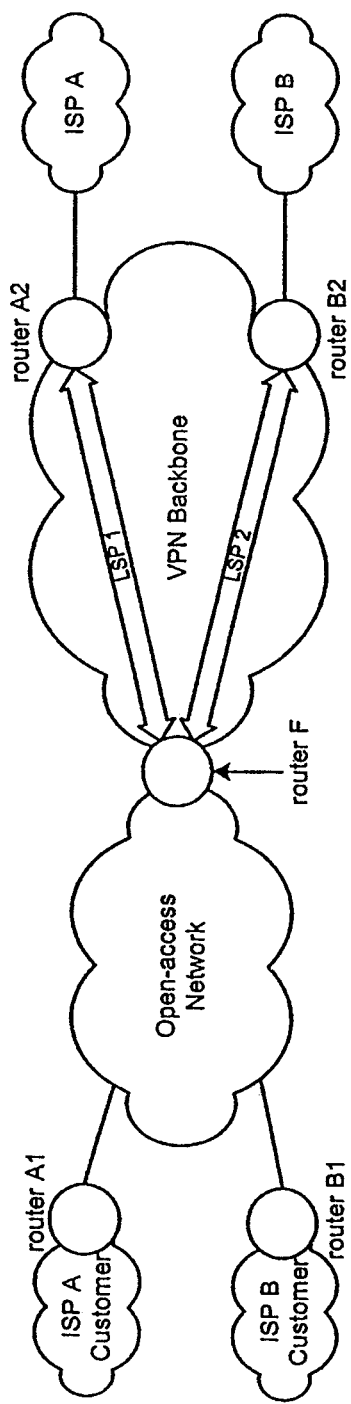
FIG. 6 shows a second example of a network topology using a router according to the invention.

FIG. 6 shows a network topology similar to the one shown in FIG. 5, further including a VPN backbone connecting router F to routers A2 and B2. Established within the VPN backbone are LSP 1 and LSP 2 over which packets destined to the networks of ISP A and ISP B are transmitted, respectively. As in the network shown in FIG. 5, router F classifies packets using its firewall filter to identify which packets have come from the ISP A customer and which packets have come from the ISP B customer. Router F uses the appropriate forwarding tables based on its classifications of the packets. Those forwarding tables may contain entries corresponding to respective LSPs 1 and 2.

Figure 7:
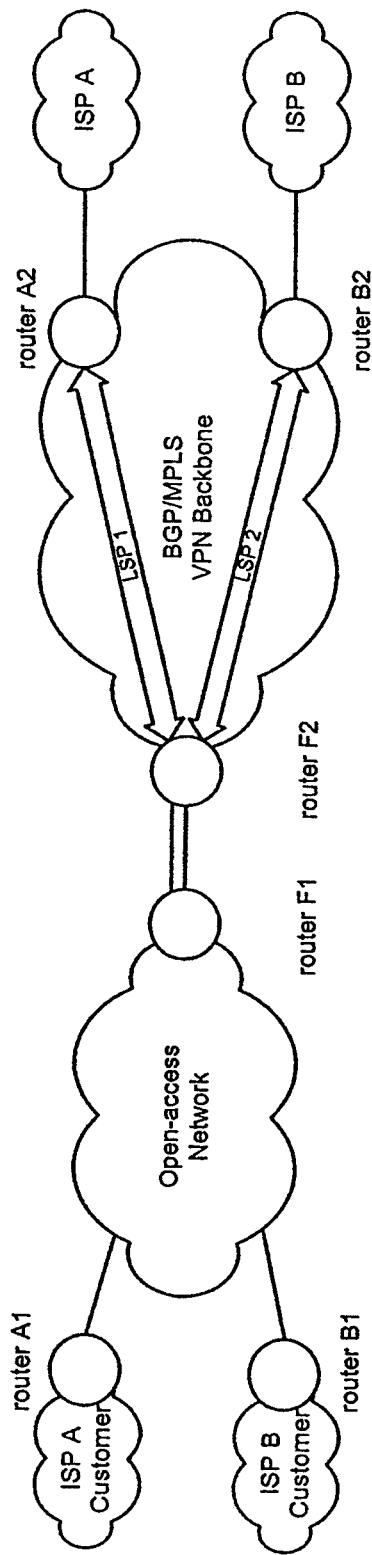
FIG. 7 shows a third example of a network topology using a router according to the invention.

FIG. 7 shows an alternative network topology to the one shown in FIG. 6. As shown in FIG. 7, two routers, routers F1 and F2, are used in place of router F. Router F1 performs filtering and separates packets from the ISP A customer and the ISP B customer. Packets from each of these respective ISP customers are transmitted over separate egress interface ports of router F1 and accordingly sent over separate links to router F2. In router F2, sets of ingress and egress interface ports are bound to the networks of respective ISPs. That is, traffic received at one ingress interface port is forwarded out of the egress interface port to which it is bound. Each set of interface ports corresponds to an ISP.

Figure 8:
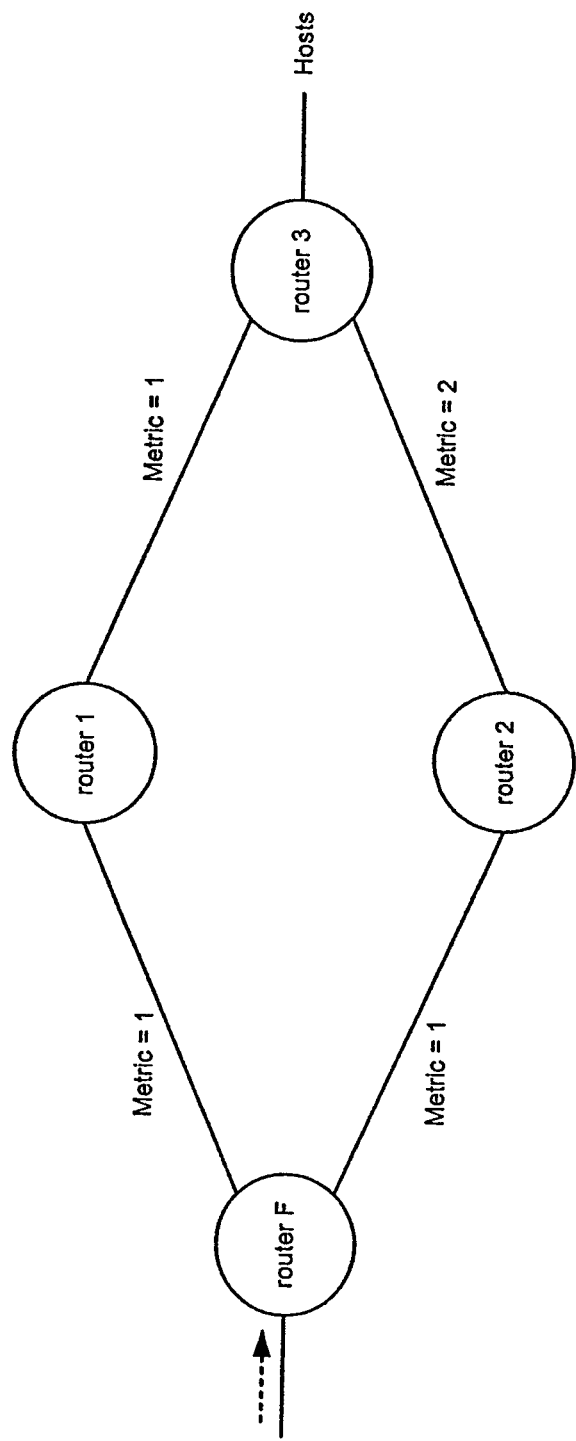
FIG. 8 shows a fourth example of a network topology using a router according to the invention.

FIG. 8 shows another exemplary network topology that utilizes a router in accordance with the present invention. The network topology shown in FIG. 8 illustrates how the router of the present invention may be used for traffic engineering. In a typical case, packets coming into router F would be routed to router 3 based on an algorithm that determines a least cost path. Here, packets coming into router F would be routed to router 3 via router 1 (1+1=2) because the combined metric through router 1 is lower than the combined metric through router 2 (1+2=3). To facilitate traffic engineering, the firewall filter in router F may be programmed to classify certain packets received by router F, such as voice traffic or traffic from certain source addresses, and select a routing table that would forward such packets to router 3 via router 2. In this way, certain kinds of traffic can be routed over a different path then what would otherwise be computed using least cost path computations.

Other embodiments of the invention will be apparent to those skilled in the art from consideration of the specification and practice of the invention disclosed herein. For example, while the invention has been described in connection with a router, the invention may also be used in a switch or other networking device in which actions are performed on packets. Further, while the invention has been described in connection with tables (routing tables and forwarding tables), the invention may also use route or forwarding information stored in other data structures/forms or in databases. It is intended that the specification and examples be considered as exemplary only, with a true scope and spirit of the invention being indicated by the following claims.

What is claimed is:

1. A method comprising:

receiving, by a networking device, a particular packet;

determining, by the networking device, whether a source address of the particular packet is in a particular range of source addresses;

performing, by the networking device, a first lookup operation in a first forwarding table, without performing a lookup operation in a second forwarding table, to identify a first egress port, of the networking device, when the source address of the particular packet is in the particular range of source addresses;

performing, by the networking device, a second lookup operation in the second forwarding table, without performing the first lookup operation in the first forwarding table, to identify a second egress port, of the networking device, when the source address of the particular packet is not in the particular range of source addresses, at least one of the first forwarding table or the second forwarding table containing information associated with at least one level of indirection, the information associated with the at least one level of indirection including information associating the source address with one or more next hop identifiers, information associating the one or more next hop identifiers with at least one of the identified first egress port or the identified second egress port being included in a resolution table; and forwarding, by the networking device and using the information in the resolution table, the particular packet to the identified first egress port or the identified second egress port.

2. The method of claim 1, further comprising:
classifying the particular packet based on the source address; and
performing the first lookup operation or the second lookup operation based on the classifying.

3. The method of claim 2, where the classifying comprises determining whether the source address meets one or more criteria.

4. The method of claim 3, where the classifying further comprises assigning a default classification when none of the one or more criteria is met.

5. The method of claim 1, where the first forwarding table contains an entry corresponding to a first label switched path.

6. The method of claim 5, where the second forwarding table contains an entry corresponding to a second label switched path.

7. The method of claim 1, where the first and second forwarding tables contain entries associating address ranges with egress port identifiers corresponding to the first egress port and the second egress port.

8. A networking device comprising:
a memory to store a first forwarding table, a second forwarding table, and a resolution table;
a filter to:
  initiate, to identify a first egress interface, a first lookup operation in the first forwarding table when a source address of a received packet is in a particular range of source addresses; and
  initiate, to identify a second egress interface, a second lookup operation in the second forwarding table when the source address is not in the particular range of source addresses,
    at least one of the first forwarding table or the second forwarding table containing information associated with at least one level of indirection,
    the information associated with the at least one level of indirection including information associating the source address with one or more next hop identifiers,
    information associating the one or more next hop identifiers with at least one of the first egress interface or the second egress interface being included in the resolution table;
a plurality of ingress interfaces to receive packets; and
a plurality of egress interfaces to receive the packets, based on information in the resolution table, and transmit the packets,
  the plurality of egress interfaces including the first egress interface and the second egress interface,
    the first results operation resulting in an identification of the first egress interface, and
    the second lookup operation resulting in an identification of the second egress interface,
      the received packet being transmitted from the first egress interface or the second egress interface.

9. The networking device of claim 8, where the first forwarding table contains an entry corresponding to a first label switched path.

10. The networking device of claim 9, where the second forwarding table contains an entry corresponding to a second label switched path.

11. The networking device of claim 8, where the filter is further to:
classify the received packet based on the source address.

12. The networking device of claim 11, where the filter is further to:
initiate the first lookup operation or the second lookup operation based on classifying the received packet.

13. The networking device of claim 11, where the filter, when classifying the received packet, is further to:
determine whether the source address meets one or more criteria; and
classify the received packet based on the determination.

14. The networking device of claim 13, where the filter, when classifying the received packet, is further to:
assign a default classification when none of the one or more criteria is met; and
classify the received packet based on assigning the default classification.

15. The networking device of claim 8, where the first and second forwarding tables contain entries associating address ranges with egress interface port identifiers corresponding to the plurality of egress interfaces.

16. The networking device of claim 8, where
at least one of the first lookup operation or the second lookup operation results in an identification of a next hop egress interface to which one of the received packets is to be transmitted.

17. A method comprising:
generating, by a device, a first forwarding table including information identifying a first egress interface port;
generating, by the device, a second forwarding table including information identifying a second egress interface port;
programming, by the device, a filter to initiate a first lookup operation in the first forwarding table when a received packet is classified in a first manner based on a source address of the received packet being in a first range of source addresses;
programming, by the device, the filter to initiate a second lookup operation in the second forwarding table when the received packet is classified in a second manner based on the source address being in a second range of source addresses,
  the second manner being different than the first manner, and
  at least one of the first forwarding table or the second forwarding table containing information associated with at least one level of indirection,
    the information associated with the at least one level of indirection including information associating the source address with one or more next hop identifiers,
    information associating the one or more next hop identifiers with at least one of the first egress interface port or the second egress interface port being included in a resolution table,
    the information in the resolution table being used to forward the received packet to the first egress interface port or the second egress interface port; and
programming, by the device, the filter to initiate a third lookup operation in the second forwarding table when the source address of the received packet is not in the first range of source addresses or the second range of source addresses.

18. The method of claim 17, where the first forwarding table contains an entry corresponding to a first label switched path.

19. The method of claim 18, where the second forwarding table contains an entry corresponding to a second label switched path.

20. The method of claim 17, where the first and second forwarding tables contain entries associating address ranges with egress interface port identifiers corresponding to the first egress interface port and the second egress interface port.

* * * * *

UNITED STATES PATENT AND TRADEMARK OFFICE
CERTIFICATE OF CORRECTION

PATENT NO. : 9,106,506 B2
APPLICATION NO. : 12/878849
DATED : August 11, 2015
INVENTOR(S) : Ken Kuwabara et al.

It is certified that error appears in the above-identified patent and that said Letters Patent is hereby corrected as shown below:

Claims

Please correct Claim 8 as follows:

Column 7, line 56, change "results" to -- lookup --.

Signed and Sealed this
Twenty-second Day of December, 2015

Michelle K. Lee
*Director of the United States Patent and Trademark Office*